US006811038B1

(12) United States Patent
Sanderson

(10) Patent No.: US 6,811,038 B1
(45) Date of Patent: Nov. 2, 2004

(54) BRACKET FOR VEHICLE DOOR STORAGE

(76) Inventor: Mark A. Sanderson, 855 Fairemoore Ct., Suwanee, GA (US) 30024

( * ) Notice: Subject to any disclaimer, the term of this patent is extended or adjusted under 35 U.S.C. 154(b) by 0 days.

(21) Appl. No.: 10/269,789

(22) Filed: Oct. 10, 2002

(51) Int. Cl.$^7$ .................................................. A47F 7/00
(52) U.S. Cl. .................... 211/13.1; 211/87.01; 211/169; 248/309.1
(58) Field of Search ............................. 211/193, 87.01, 211/47, 48, 169, 13.1; 248/309.1

(56) References Cited

U.S. PATENT DOCUMENTS

| 447,815 | A |   | 3/1891  | Frercks      |
|---------|---|---|---------|--------------|
| 595,549 | A | * | 12/1897 | Roush        |
| 1,366,526 | A |   | 1/1921  | Deragon    |
| 1,826,469 | A |   | 10/1931 | Hunt et al.|
| 2,070,408 | A |   | 2/1937  | Leidgen    |
| 3,412,868 | A |   | 11/1968 | Carter     |
| 3,565,260 | A |   | 2/1971  | Stewart    |
| 3,777,896 | A |   | 12/1973 | Ehrlich    |
| 3,960,273 | A |   | 6/1976  | Weston     |
| 4,070,056 | A | * | 1/1978  | Hickman    |
| 4,644,699 | A | * | 2/1987  | Chandler et al. |
| 4,913,297 | A |   | 4/1990  | Wells      |
| 5,503,278 | A |   | 4/1996  | Ishmael    |
| 5,806,687 | A | * | 9/1998  | Ballesteros et al. ......... 211/169 |
| 6,044,984 | A |   | 4/2000  | Crosby et al. |
| 6,260,296 | B1 |  | 7/2001  | Carney, Jr.|
| 6,286,692 | B1 | * | 9/2001 | Hemping ..................... 211/169 |

* cited by examiner

Primary Examiner—Robert W. Gibson, Jr.
(74) Attorney, Agent, or Firm—Hinkle & O'Bradovich, LLC

(57) ABSTRACT

A surface-mounted bracket for receiving and storing removable vehicle doors is disclosed. In general, embodiments of the bracket include an elongated bar, a first support bar connected generally perpendicular to the vertical bar, and a second support bar connected generally perpendicular to the vertical bar, the second support bar being offset and generally parallel to the first support bar. The support bars include support brackets that are adapted to receive the male hinge pins on vehicle doors. The brackets can further include stabilizers to prevent the doors from swinging on the support brackets.

20 Claims, 2 Drawing Sheets

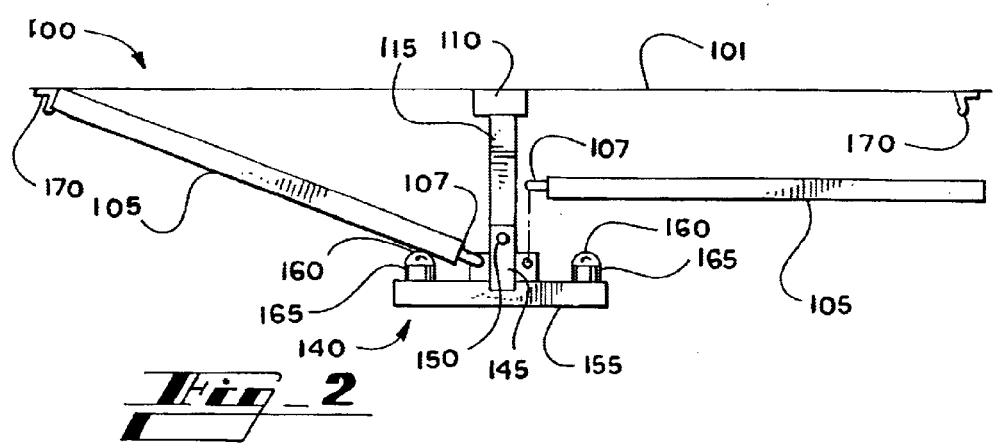
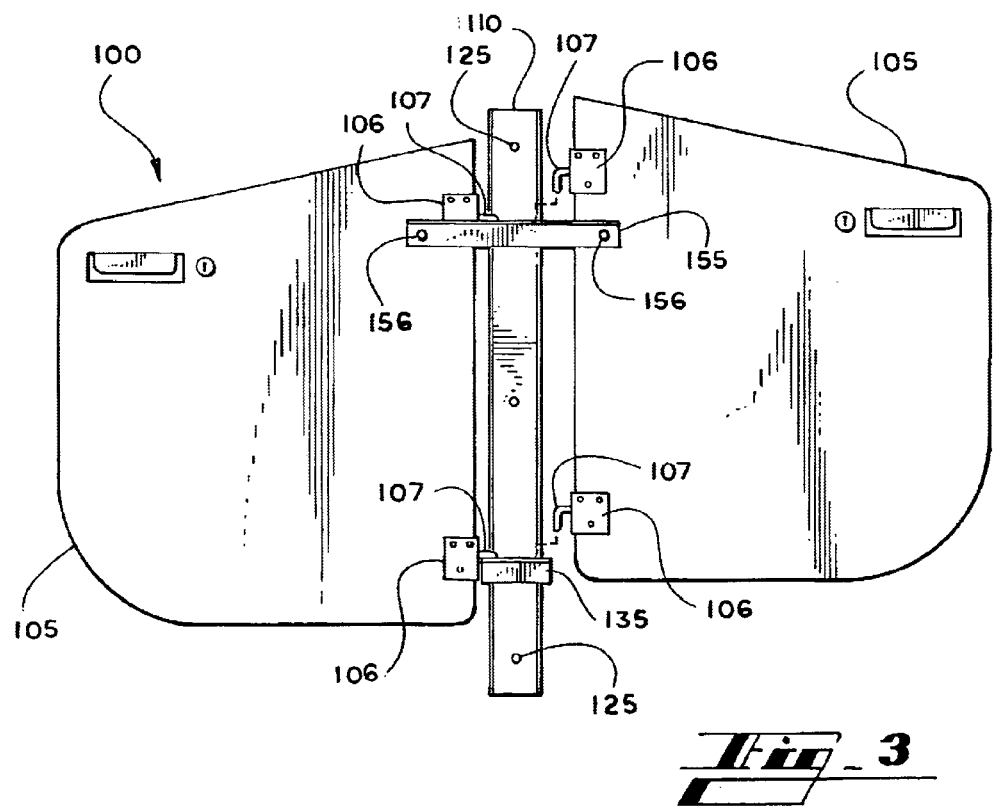

BRACKET FOR VEHICLE DOOR STORAGE

BACKGROUND OF THE INVENTION

I. Field of the Invention

The present invention relates generally to the field of automobiles and automotive parts and accessories, and more particularly to an apparatus and system for the storage of automotive doors.

II. Description of the Related Art

The doors from Jeeps® are attached to the Jeep® using a hinge system. Typically the Jeep® doors have male hinge pins that can be hung on female hinges on the body of the Jeep®. Often the driver removes the doors by lifting the doors off the female hinges. The doors are typically stored in a large plastic cover or simply in the garage or home. The doors can often be in the way or become scratched or damaged.

SUMMARY OF THE INVENTION

In general, the invention features a wall mounted bracket that receives the existing male hinge pins of the Jeep® doors so that they can be hung on the bracket.

In general, in one aspect, the invention features an automotive door storage apparatus, including a surface mounted bracket including an elongated bar, a first support bar connected generally perpendicular to the vertical bar, and a second support bar connected generally perpendicular to the vertical bar, the second support bar being offset and generally parallel to the first support bar and a stabilizer having a connection plate removably connected to at least one of the first and second support bars by a connection pin, the connection plate including a stabilizer plate connected generally perpendicular to the connection plate.

In one implementation, the apparatus includes a support bracket having pin holes, each bracket being connected to each of the first and second support bars.

In another implementation, each support bracket has a general L shape, wherein a plate of the bracket includes the pin holes.

In another implementation, the apparatus includes a plurality of holes located on the elongated bar, the holes being adapted to receive a fasteners for affixing the apparatus to the surface.

In still another implementation, the stabilizer plate has a general L shape.

In yet another implementation, the apparatus includes a bumper connected to the stabilizer plate and a washer connected between the bumper and the stabilizer plate.

In another implementation, the stabilizer plate is generally in contact with the support bracket.

In another implementation, the apparatus includes a pin hole on at least one of the first and second support bars.

In another implementation, the apparatus includes a pin connected to the connection plate, the pin being adapted to connect to the pin hole on the support bar.

In another aspect, the invention features an automotive door storage apparatus, including a surface mounted bracket including an elongated bar, a first support bar connected generally perpendicular to the vertical bar, and a second support bar connected generally perpendicular to the vertical bar, the second support bar being offset and generally parallel to the first support bar and a plurality a locking clips connected to the surface and generally adjacent to the surface mounted bracket.

In one implementation, each support bracket has a general L shape, wherein a plate of the bracket includes the pin holes In another implementation, the apparatus includes plurality of holes located on the elongated bar, the holes being adapted to receive a fasteners for affixing the apparatus to the surface.

In still another aspect, the invention features an automotive door storage system, including a surface mounted bracket including an elongated bar having a plurality of holes located on the elongated bar, the holes being adapted to receive a fasteners for affixing the apparatus to the surface, a first support bar connected generally perpendicular to the vertical bar, and a second support bar connected generally perpendicular to the vertical bar, the second support bar being offset and generally parallel to the first support bar, a support bracket having pin holes, each bracket being connected to each of the first and second support bars, wherein each support bracket has a general L shape, wherein a plate of the bracket includes the pin holes and at least one automotive door connected to the first and second support brackets, the door having pins adapted to be connected to an automobile.

In one implementation, the pins on the automotive door are connected respectively to the pin holes on the support brackets.

In another implementation, the system includes a door retaining device that can be a stabilizer comprising a connection plate removably connected to at least one of the first and second support bars by a connection pin connected to the connection plate, the connection pin being connected to a pin hole on the support bar, the connection plate including a stabilizer plate connected generally perpendicular to the connection plate, wherein the stabilizer plate has a general L shape and is generally in contact with the support bracket.

In another implementation, the system includes a bumper connected to the stabilizer plate and a washer connected between the bumper and the stabilizer plate, wherein the bumper is adapted to contact the doors thereby preventing the doors from swinging about the hinge pins.

In another implementation, the door retaining device is a plurality a locking clips connected to the surface and generally adjacent to the surface mounted bracket, the clips being adapted to receive an edge of the doors and lock the doors adjacent the surface, thereby preventing the doors from swinging about the hinge pins.

In yet another aspect, the invention features an automotive door storage kit, including a bracket adapted to be mounted to a surface and a door retaining device adapted to be used in conjunction with the bracket to stabilize the door in a stored position.

In one implementation, the bracket comprises an elongated bar having a plurality of holes located on the elongated bar, the holes being adapted to receive a fasteners for affixing the apparatus to the surface, a first support bar connected generally perpendicular to the vertical bar, and a second support bar connected generally perpendicular to the vertical bar, the second support bar being offset and generally parallel to the first support bar and a support bracket having pin holes, each bracket being connected to each of the first and second support bars, wherein each support bracket has a general L shape, wherein a plate of the bracket includes the pin holes.

In another implementation, the door retaining device is a stabilizer comprising a connection plate removably connected to at least one of the first and second support bars by a connection pin connected to the connection plate, the connection pin being connected to a pin hole on the support bar, the connection plate including a stabilizer plate connected generally perpendicular to the connection plate, wherein the stabilizer plate has a general L shape and is generally in contact with the support bracket, a bumper connected to the stabilizer plate and a washer connected between the bumper and the stabilizer plate, wherein the bumper is adapted to contact the doors thereby preventing the doors from swinging about the hinge pins.

In another implementation, the door retaining device is a plurality a locking clips connected to the surface and generally adjacent to the surface mounted bracket, the clips being adapted to receive an edge of the doors and lock the doors adjacent the surface, thereby preventing the doors from swinging about the hinge pins.

In another aspect, the invention features a door storage device, including a surface mounted bracket including an elongated bar, a first support bar connected generally perpendicular to the vertical bar, and a second support bar connected generally perpendicular to the vertical bar, the second support bar being offset and generally parallel to the first support bar and means for retaining the door on the bracket when the door is attached to the bracket.

In another aspect, the invention features a door storage device, including a surface mounted bracket including an elongated bar having a plurality of holes located on the elongated bar, the holes being adapted to receive a fasteners for affixing the apparatus to the surface, a first support bar connected generally perpendicular to the vertical bar, and a second support bar connected generally perpendicular to the vertical bar, the second support bar being offset and generally parallel to the first support bar and a support bracket having pin holes, each bracket being connected to each of the first and second support bars, wherein each support bracket has a general L shape, wherein a plate of the bracket includes the pin holes.

One advantage of the invention is that automotive doors that can be removed from vehicles can be stored in a remote and convenient location.

Another advantage of the invention is that automotive doors can be stored in a location that protects the doors from damage.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 2 illustrates a top view of an embodiment of a bracket for vehicle door storage; and FIG. 3 illustrates a front view of an embodiment of a bracket for vehicle door storage.

DETAILED DESCRIPTION

Figure 1:
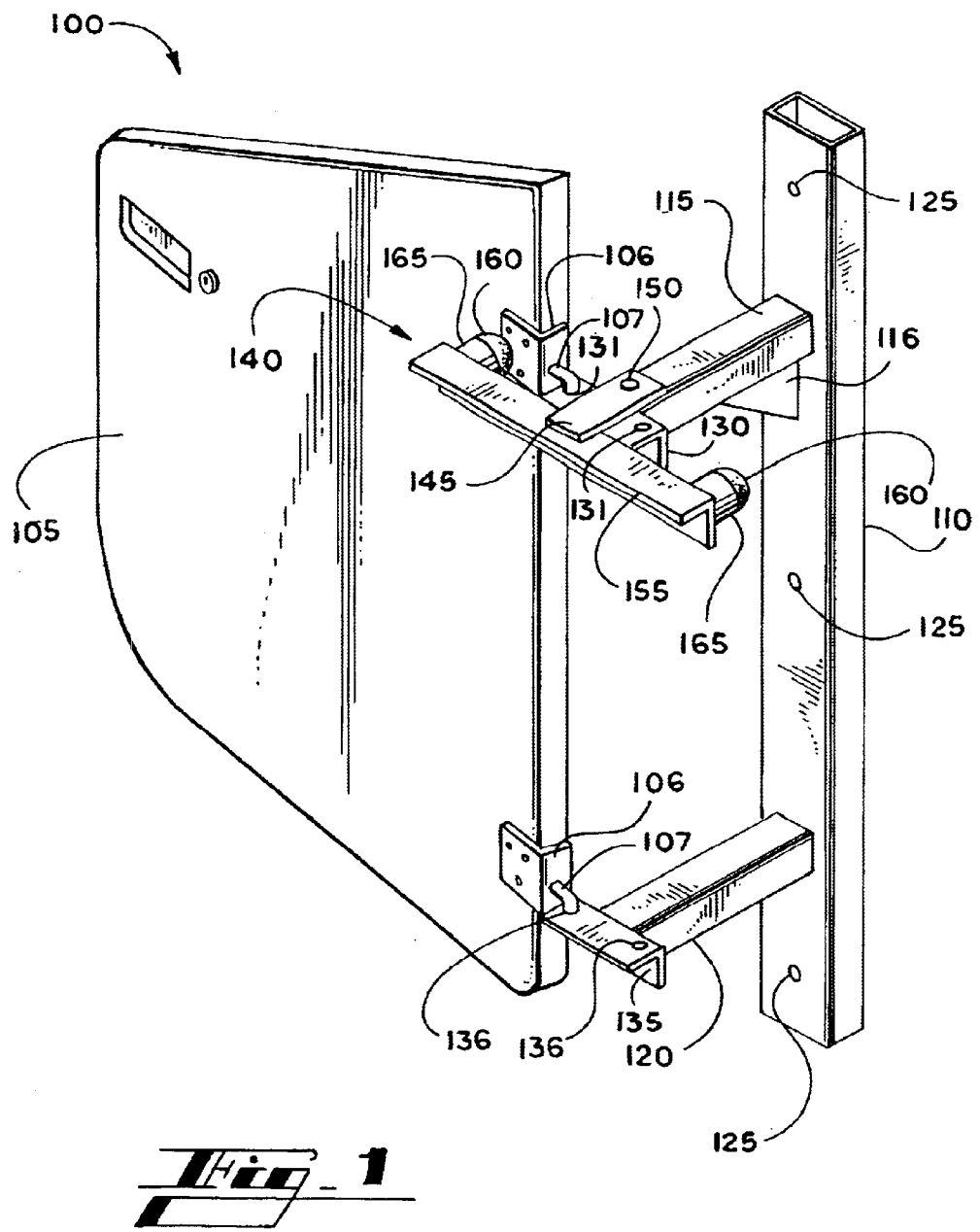
FIG. 1 illustrates a view of an embodiment of a bracket for vehicle door storage.

Throughout the specification and the claims, vehicle doors are frequently discussed. It is understood that the embodiments discussed below contemplate the embodiments used in conjunction with any type of vehicle door that can be removed. The type of vehicle door illustrated for discussion purposes is a Jeep® brand door.

Referring to the drawings wherein like reference numerals designate corresponding parts throughout the several figures, reference is made first to FIG. 1 that illustrates a view of an embodiment of a bracket for vehicle door storage 100 including one door 105 connected to the bracket 100. The bracket 110 is further adapted to receive another door (not shown). Only one door 105 is illustrated for discussion purposes. Each door 105 includes, among other things, hinge plates 106 and male pins 107.

The bracket can generally include an elongated vertical bar 110, a first support bar 115 connected generally perpendicular to the vertical bar, and a second support bar 120 connected generally perpendicular to the vertical bar 110, the second support bar 120 being offset and generally parallel to the first support bar 115. The support bars 115, 120 can also include a support truss 116 connected generally between the support bar 115, 120 and the elongated bar 110. The support truss 116 can generally allow the support bars 115, 120 to hold more weight.

The elongated bar 110 is shown as generally rectangular with a hollow interior. It is understood that the elongated bar 110 can be a variety of suitable shapes and have several forms, such as but not limited to a flat planar shape. The elongated bar 110 is adapted to be affixed to a wall, beam or other suitable structure for mounting. The elongated bar 110 includes several mounting holes 125 so that screws, nails or other suitable fasteners can be inserted to mount to the wall. In a typical implementation, the bracket 100 is adapted to be attached to a wall in a garage, where it is convenient to store the doors 105.

Each of the first and second support bars 115, 120 include a support bracket 130, 135, each respectively connected to the support bars 115, 120 at the end of the support bars 115, 120 opposite to the end connected to the elongated bar 110. The support brackets 130, 135 are generally "L" shaped, one plate of the "L" being generally parallel to the elongated bar 110 and the other plate of the "L" being generally perpendicular to the elongated bar 110. The support brackets 130, 135 include pin holes 131, 136, respectively. The male hinge pins 107 can then be inserted into the pin holes 131, 136 to hang the doors 105 on the bracket 100.

Although the vehicle doors 105 can typically be hung on the bracket 100 without any further assistance, a stabilizer 140 can be connected to the bracket 100 in order to prevent the doors 105 from pivoting about the pin hole 131, 136 thereby causing a hinging effect. The stabilizer 140 can be added to prevent the hinging effect.

In one embodiment the stabilizer 140 can include a connection plate 145 connected to the first support bar 115 by a connection pin 150 which fits through a pin hole (not shown) on the first support bar 115. The connection plate 145 further includes a stabilizer plate 155 connected generally perpendicular to the connection plate 145. In order to keep the stabilizer 140 as steady as possible, the stabilizer plate 155 and the support bracket 130 are typically in contact, with little to no space allowing noticeable movement between them. It is understood that the stabilizer can also be connected to the second support bar 120. In another implementation, two stabilizers can be connected to the bracket 100 one on each of the first and second support bars 115, 120.

The stabilizer 140 further includes bumpers 160 that can further include washers 165 connected between the bumper 160 and the stabilizer plate 155. The bumpers 160 are connected typically at the opposite ends of the stabilizer plate 155, although they can be connected at any point along the stabilizer bar 155. The bumpers 160 are typically included on the bracket 100 in order to prevent damage to the doors 105. The bumpers 160 are therefore typically rubber or other soft and flexible yet sturdy material.

It is understood that other embodiments of stabilizers are contemplated in the above description, the stabilizers being generally classified as door retaining devices. Other types of stabilizers are also contemplated as illustrated in FIG. 2 that illustrates a top view of an embodiment of a bracket 100 for vehicle door 105 storage connected to a wall 101. As described with respect to FIG. 1, the bracket 100 includes an elongated bar 110 and a first support bar 115 connected generally perpendicular to the vertical bar 110. The second support bar is not shown in this view. The bracket 100 further optionally includes a stabilizer 140 that includes a connection plate 145 connected to the first support bar 115 by a connection pin 150 which fits through a pin hole (not shown) on the first support bar 115. The connection plate 145 further includes a stabilizer plate 155 connected generally perpendicular to the connection plate 145. In order to keep the stabilizer 140 as steady as possible, the stabilizer plate 155 and the support bracket 130 are typically in contact, with little to no space allowing noticeable movement between them. It is understood that the stabilizer can also be connected to the second support bar 120. In another implementation, two stabilizers can be connected to the bracket 100 one on each of the first and second support bars 115, 120.

The stabilizer 140 further includes bumpers 160 that can further include washers 165 connected between the bumper 160 and the stabilizer plate 155. The bumpers 160 are connected typically at the opposite ends of the stabilizer plate 155, although they can be connected at any point along the stabilizer bar 155. The bumpers 160 are typically included on the bracket 100 in order to prevent damage to the doors 105. The bumpers 160 are therefore typically rubber or other soft and flexible yet sturdy material.

FIG. 2 further illustrates locking clips 170 that are typically an alternate embodiment of a stabilizer. The locking clips are typically flexible and sturdy. They are typically connected to the wall 101 adjacent the bracket 100 at a suitable location that is within the pathway of the swinging door 105. The edge of the door can come into contact with the clips 170 are slightly displace the clips 170. Once the clips 170 are displaced, the doors 105 continue to move along their respective paths. After the doors 105 have moved pass a portion of the clips 170, the clips 170 flex back into their neutral positions thereby locking the doors 105 into a secure position. Since, the clips 170 are flexible, the doors 105 can easily be unlocked from the clips 170 by pulling on the doors 105.

The bracket 100 can typically be used with just the clips 170. The bracket 100 can also be used with just the stabilizer 140. The bracket 100 can be used with both the stabilizer 140 and the clips 170. The bracket 100 can also be used without either the clips 170 or the stabilizer. It is therefore understood that the doors 105 can be stabilized, thereby preventing swinging, by various combinations of the embodiments described above.

FIG. 3 illustrates a front view of an embodiment of a bracket 100 for vehicle door storage. Two doors 105 are shown in a storage position and a position just prior to storage.

The elongated bar 110 is set vertically on a wall, and a front view of the support bracket 135 is shown on the second support bar (see FIGS. 1–2). The front view of the stabilizer bar 155 of the stabilizer 140 (see FIGS. 1–2) is shown. Fasteners 156 are shown on the stabilizer bar 155. The fasteners 156 are typically screws or other suitable devices to connect the bumpers 160 and washers 165 (see FIGS. 1–2) to the stabilizer bar 155. As described above, the hinge pins 107 connected to the hinge plates 106 are hung onto the first and second support brackets 130, 135 of the first and second support bars 115, 120. In this front view, the stabilizer is used to prevent the doors 105 from swinging on the support brackets 130, 135. As described above, the stabilizer is not necessary for use with the bracket. Furthermore, the clips 170 can be used by themselves as a stabilizer or in conjunction with the stabilizer 140.

The embodiments described above have been discussed as being mountable to a garage wall. It is understood that the embodiments are suitable for mounting to any type of suitable surface including exposed beams and the like. The discussion should not be construed as limited to any one type of surface.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. An automotive door storage apparatus, comprising:
   a surface mounted bracket including an elongated vertical bar, a first support bar connected generally perpendicular to the elongated vertical bar, and a second support bar connected generally perpendicular to the elongated vertical bar, the second support bar being offset and Generally parallel to the first support bar;
   a stabilizer having a connection plate removably connected to at least one of the first and second support bars by a connection pin, the connection plate including a stabilizer plate connected generally perpendicular to the connection plate; and
   a support bracket connected to each of the first and second support bars, each support bracket having gin holes.

2. The apparatus as claimed in claim 1 wherein each support bracket has a general L shape, wherein a plate of the support bracket includes the pin holes.

3. The apparatus as claimed in claim 1 further comprising a plurality of holes located on the elongated vertical bar, the holes being adapted to receive a fasteners for affixing the apparatus to the surface.

4. The apparatus as claimed in claim 1 wherein the stabilizer plate has a general L shape.

5. The apparatus as claimed in claim 1 further comprising a bumper connected to the stabilizer plate and a washer connected between the bumper and the stabilizer plate.

6. The apparatus as claimed in claim 1 wherein the stabilizer plate is generally in contact with the support bracket.

7. The apparatus as claimed in claim 1 further comprising a pin hole on at least one of the first and second support bars.

8. The apparatus as claimed in claim 7 further comprising a pin connected to the connection plate, the pin being adapted to connect to the pin hole on the support bar.

9. An automotive door storage apparatus, comprising:
   a surface mounted bracket including an elongated vertical bar, a first support bar connected generally perpendicular to the elongated vertical bar, and a second support bar connected generally perpendicular to the elongated vertical bar, the second support bar being offset and generally parallel to the first support bar; and
   a plurality a locking clips connected to the surface and generally adjacent to the surface mounted bracket.

10. The apparatus as claimed in claim 9 further comprising a support bracket connected to each of the support bars, wherein each support bracket has a general L shape, wherein a plate of each support bracket includes the pin holes.

11. The apparatus as claimed in claim 9 further comprising a plurality of holes located on the elongated bar, the holes being adapted to receive a fastener for affixing the apparatus to the surface.

12. An automotive door storage system, comprising:
   a surface mounted bracket including an elongated vertical bar having a plurality of holes located on the elongated vertical bar, the holes being adapted to receive a fasteners for affixing the apparatus to the surface;
   a first support bar connected generally perpendicular to the elongated vertical bar, and a second support bar connected generally perpendicular to the vertical bar, the second support bar being offset and generally parallel to the first support bar;
   a support bracket connected to each of the first and second support bars, each support bracket having pin holes, wherein each support bracket has a general L shape, wherein a plate of the bracket includes the pin holes; and
   at least one automotive door connected to the first and second support brackets, the door having pins adapted to be connected to an automobile.

13. The system as claimed in claim 12 wherein the pins on the automotive door are connected respectively to the pin holes on the support brackets.

14. The system as claimed in claim 12 further comprising a door retaining device.

15. The system as claimed in claim 14 wherein the door retaining device is a stabilizer comprising a connection plate removably connected to at least one of the first and second support bars by a connection pin connected to the connection plate, the connection pin being connected to a pin hole on the support bar, the connection plate including a stabilizer plate connected generally perpendicular to the connection plate, wherein the stabilizer plate has a general L shape and is generally in contact with the support bracket.

16. The apparatus as claimed in claim 15 further comprising:
   a bumper connected to the stabilizer plate; and
   a washer connected between the bumper and the stabilizer plate, wherein the bumper is adapted to contact the doors thereby preventing the doors from swinging about the hinge pins.

17. The system as claimed in claim 14 wherein the door retaining device is a plurality a locking clips connected to the surface and generally adjacent to the surface mounted bracket, the clips being adapted to receive an edge of the automotive door and lock the automotive door adjacent the surface, thereby preventing the automotive door from swinging about the pins.

18. An automotive door storage kit, comprising:
   a bracket adapted to be mounted to a surface; and
   a door retaining device adapted to be used in conjunction with the bracket to stabilize an automotive door having gins adapted to be connected to an automobile, in a stored position,
   wherein the bracket comprises an elongated vertical bar having a plurality of holes located on the elongated vertical bar, the holes being adapted to receive a fasteners for affixing the apparatus to the surface, a first support bar connected generally perpendicular to the vertical bar, and a second support bar connected generally perpendicular to the elongated vertical bar, the second support bar being offset and generally parallel to the first support bar and wherein each support bar includes a support bracket having pin holes, wherein each support bracket has a general L shape, wherein a plate of the bracket includes the pin holes.

19. An automotive door storage kit, comprising:
   a bracket adapted to be mounted to a surface; and
   a door retaining device adapted to be used in conjunction with the bracket to stabilize an automotive door having pins adapted to be connected to an automobile, in a stored position.
   wherein the door retaining device is a stabilizer comprising a connection plate removably connected to at least one of the first and second support bars by a connection pin connected to the connection plate, the connection pin being connected to a pin hole on the support bar, the connection plate including a stabilizer plate connected generally perpendicular to the connection plate, wherein the stabilizer plate has a general L shape and is generally in contact with the support bracket, a bumper connected to the stabilizer plate and a washer connected between the bumper and the stabilizer plate, wherein the bumper is adapted to contact the automotive door thereby preventing the automotive door from swinging about the pins.

20. An automotive door storage kit, comprising:
   a bracket adapted to be mounted to a surface; and
   a door retaining device adapted to be used in conjunction with the bracket to stabilize an automotive door having pins adapted to be connected to an automobile, in a stored position.
   wherein the door retaining device is a plurality a locking clips connected to the surface and generally adjacent to the surface mounted bracket, the clips being adapted to receive an edge of the automotive door and lock the doors adjacent the surface, thereby preventing the automotive door from swinging about the pins.

* * * * *